United States Patent
Roig

(10) Patent No.: US 11,884,430 B2
(45) Date of Patent: Jan. 30, 2024

(54) APPARATUSES AND METHODS FOR ENCLOSING A FILLING IN A FOOD PRODUCT

(71) Applicant: Société des Produits Nestlé S.A., Vevey (CH)

(72) Inventor: Francisco Roig, Amiens (FR)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 95 days.

(21) Appl. No.: 17/562,178

(22) Filed: Dec. 27, 2021

(65) Prior Publication Data
US 2022/0212817 A1 Jul. 7, 2022

Related U.S. Application Data

(60) Provisional application No. 63/134,020, filed on Jan. 5, 2021.

(51) Int. Cl.
*B65B 3/12* (2006.01)
*B65B 25/06* (2006.01)
(Continued)

(52) U.S. Cl.
CPC .............. *B65B 3/12* (2013.01); *A23N 17/005* (2013.01); *A23P 20/20* (2016.08); *B65B 3/32* (2013.01);
(Continued)

(58) Field of Classification Search
CPC ........... B65B 3/12; B65B 3/32; B65B 25/065; B65B 31/025; B65B 39/001;
(Continued)

(56) References Cited

U.S. PATENT DOCUMENTS 4,730,648 A * 3/1988 Walter .................. G01F 11/021
141/242
5,344,052 A * 9/1994 Divall ..................... B65B 3/326
222/145.2
(Continued)

FOREIGN PATENT DOCUMENTS

CN 1103546 C * 3/2003 ............. A23G 9/281
CN 113825412 A * 12/2021 ............. A23P 10/00
(Continued)

OTHER PUBLICATIONS

International Search Report and Written Opinion to PCT/IB2021/062345 dated Apr. 4, 2022.

*Primary Examiner* — Nicolas A Arnett

(57) ABSTRACT

An apparatus for making a canned food product in a can, the food product including a first composition and a second composition, and the apparatus includes a filling head including a first channel and a second channel for respectively directing the first composition and the second composition into the can. A first supply assembly includes a first supply container containing the first composition, and the first supply container is connected to the first channel; and a second supply assembly. The second supply assembly includes a second supply container containing the second composition; a dosing piston connected to the second supply container through a third channel; a hose connecting the dosing piston to the second channel; and one or more rotary valves between the dosing piston and the filling head.

22 Claims, 12 Drawing Sheets

(51) Int. Cl.
  *B65B 31/02* (2006.01)
  *B65B 39/00* (2006.01)
  *B65B 3/32* (2006.01)
  *A23N 17/00* (2006.01)
  *A23P 20/20* (2016.01)
  *A23K 50/40* (2016.01)

(52) U.S. Cl.
  CPC .......... *B65B 25/065* (2013.01); *B65B 31/025* (2013.01); *B65B 39/001* (2013.01); *A23K 50/40* (2016.05); *B65B 2220/14* (2013.01)

(58) Field of Classification Search
  CPC .. B65B 2220/14; A23N 17/005; A23K 50/40; A23P 20/20
  See application file for complete search history.

(56) References Cited

U.S. PATENT DOCUMENTS

| | | | | |
|---|---|---|---|---|
| 5,996,652 A * | 12/1999 | Schromm | ............... | B65B 59/04 141/105 |
| 6,582,740 B1 * | 6/2003 | May | ............... | A23P 20/20 426/94 |
| 6,911,224 B1 * | 6/2005 | May | ............... | A23K 10/30 426/94 |
| 9,505,506 B2 * | 11/2016 | Ammann | ............... | B65B 3/36 |
| 9,567,117 B2 * | 2/2017 | Duverger | ............... | B65B 43/52 |
| 10,899,481 B2 * | 1/2021 | Moreau | ............... | B65D 3/00 |
| 11,019,833 B2 * | 6/2021 | Moreau | ............... | A23G 9/282 |
| 11,311,031 B2 * | 4/2022 | Jensen | ............... | A23K 50/48 |
| 2013/0196035 A1 * | 8/2013 | Passet | ............... | A23G 9/24 426/232 |
| 2013/0309367 A1 * | 11/2013 | Pibarot | ............... | A23P 20/25 426/574 |
| 2013/0309372 A1 * | 11/2013 | Watelain | ............... | A23K 50/40 426/574 |
| 2014/0326360 A1 * | 11/2014 | Ammann | ............... | B65B 43/59 141/9 |
| 2016/0029665 A1 * | 2/2016 | Jensen | ............... | B65B 3/12 426/282 |

FOREIGN PATENT DOCUMENTS

| | | | | |
|---|---|---|---|---|
| EP | 0401407 A1 * | 12/1990 | ............... | B65B 3/32 |
| ES | 2518515 B1 * | 9/2015 | ............... | A22C 7/00 |
| WO | WO-03035476 A1 * | 5/2003 | ............... | B65B 3/04 |

* cited by examiner

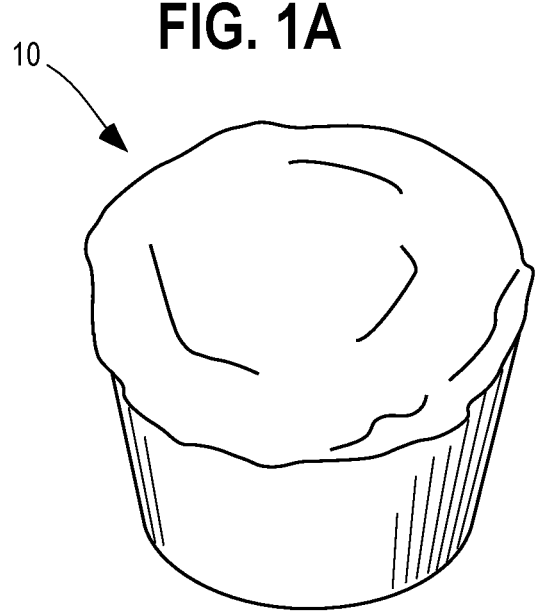
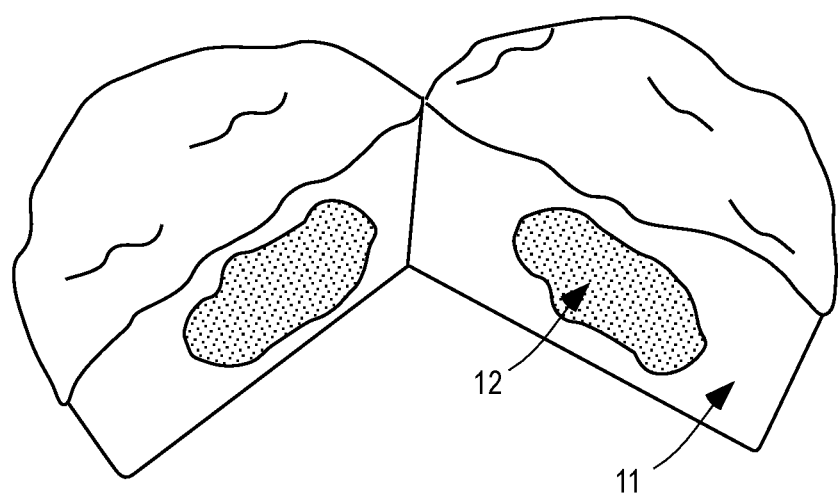

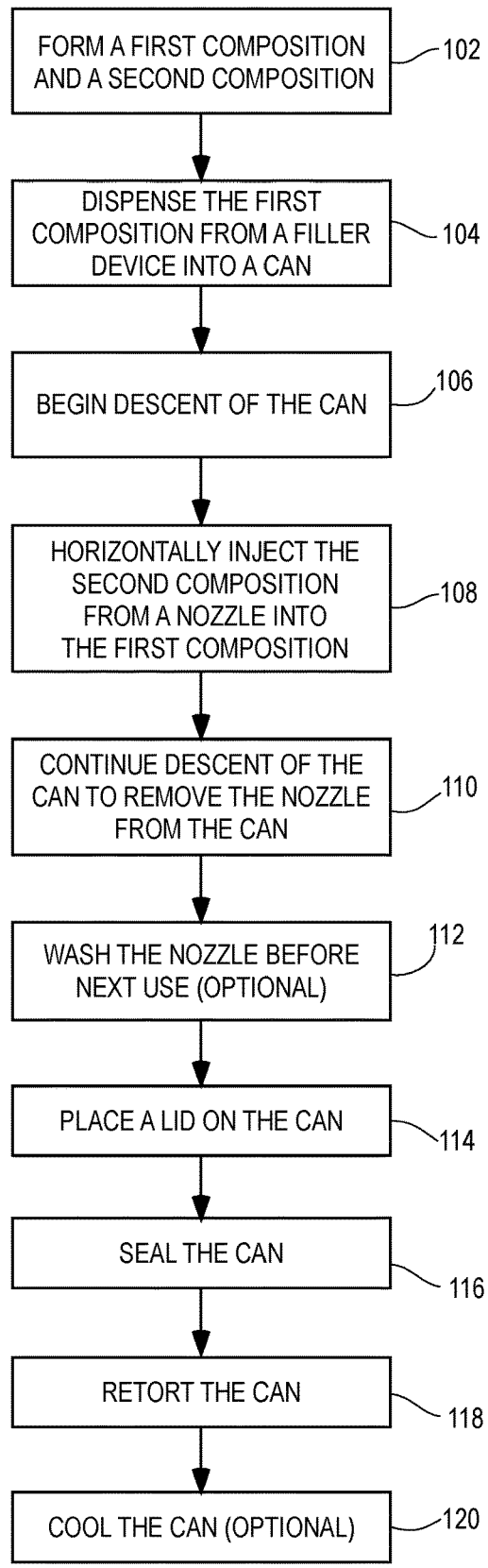

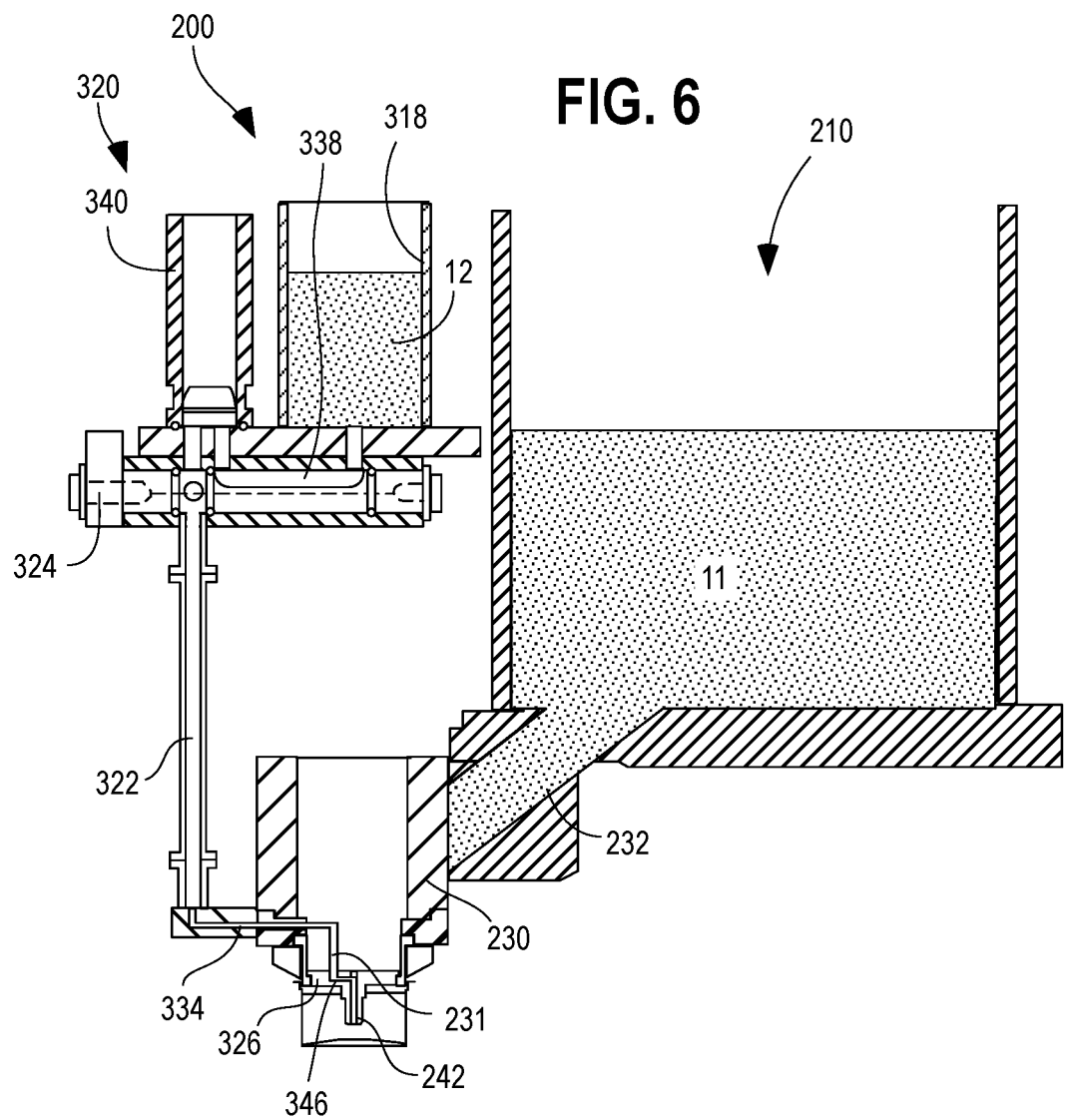

APPARATUSES AND METHODS FOR ENCLOSING A FILLING IN A FOOD PRODUCT

BACKGROUND

The present disclosure relates generally to apparatuses and methods for enclosing a filling in a food product. More specifically, the present disclosure is directed to a supply assembly for introducing a viscous filling, such as a gravy, into a loaf matrix so that the filling remains enclosed by the loaf matrix after retorting.

Conventional loaf-type food products are typically coagulated emulsions sold in containers bearing the shape of the loaf-type food products. Loaf-type food products are commonly used as pet foods because they are easily manufactured, readily digested by the animals, very palatable to the animals, and readily formulated to contain necessary nutrients and trace elements.

Pet owners are continually seeking appealing canned food forms or varieties for their pets. Although a loaf product containing a filling may be such a pet food, consistently creating a loaf-type food product having a substantial and defined filling is difficult to accomplish. Devices for forming such loaf-type food products often have problems of dispensing too little or too much filling into the loaf product.

SUMMARY

The present disclosure is directed to a filler device comprising a modified vacuum-filling head that introduces a viscous filling, such as a gravy, into a loaf matrix so that the filling remains enclosed by the set loaf matrix after retorting, The filling may remain as a viscous gravy or may set as a gel, depending on the formulation of the filling. The viscous filling is distributed horizontally into the loaf matrix during a brief pause in the descent of the can away from the filling device.

In the present application, the filler device may comprise a first supply assembly that directs a first composition, such as the loaf matrix, and a second supply assembly that directs a second composition, such as the viscous filling, to a filling head. Through operation of the filler device, first and second channels within the filling head direct the first and second compositions, respectively, into a can positioned within the filling head.

During use, the first supply assembly is operated to fill the can with a predetermined amount of the first composition. The second supply assembly is then operated to inject the second composition into the first composition within the can.

In the embodiments described herein, the second supply assembly utilizes a dosing piston to direct a predetermined amount of the second composition into the first composition in the can. The dosing piston is first operated to withdraw the predetermined amount of the second composition from a second supply container through a third channel, and then operated to dispense the predetermined amount of the second composition through a hose to the second channel adjacent the filling head.

The second supply assembly may include one or more rotary valves to control fluid flow through the hose and channels. In a first embodiment of the second supply assembly, a first valve is positioned at an outlet of the dosing piston to switch between a connection to the second supply from the container and a connection to the hose. A second valve is positioned between the hose and the second channel to control flow as it enters the second channel and is directed into the filling head. Each of the first valve and the second valve is a rotary valve driven by a mechanical cam.

In a second embodiment of the second supply assembly, the second supply assembly includes a first valve positioned at the outlet of the dosing piston to control flow from the dosing piston into the hose. The first valve is a rotary valve driven by a mechanical cam. The second supply assembly also includes a second valve or rotatable seal within the filling head. A valve channel on the second valve connects the second channel with a nozzle through which the second composition is dispensed from the filling head. The second valve moves between an open position, where the valve channel is aligned with the second channel and the nozzle, and a closed position, where the valve channel is out of alignment with the second channel and the nozzle.

An advantage of the present disclosure is to provide an apparatus and a method that form a canned pet food product containing a first composition that substantially or completely encloses a second composition utilizing components that consistently provides a loaf-type food product having a well-defined, appropriate amount of the second composition within the first composition.

A further advantage of the present disclosure is to provide an apparatus and a method for forming a canned pet food product that utilizes mechanically-driven components, thereby reducing the chance of failure of the supply assembly.

Additional features and advantages are described herein and will be apparent from the following Detailed Description and the Figures.

BRIEF DESCRIPTION OF THE FIGURES

FIG. 1A shows a perspective view of a pet food product containing a first composition completely encasing a second composition in an embodiment provided by the present disclosure.

FIG. 1B shows a perspective view of the pet food product of FIG. 1A after the product has been cut open.

FIG. 2 shows a flowchart of an embodiment of a method provided by the present disclosure.

FIG. 6 is a schematic view of a filler device including a second embodiment of a second supply assembly including a single rotary valve.

DETAILED DESCRIPTION

Figure 3:
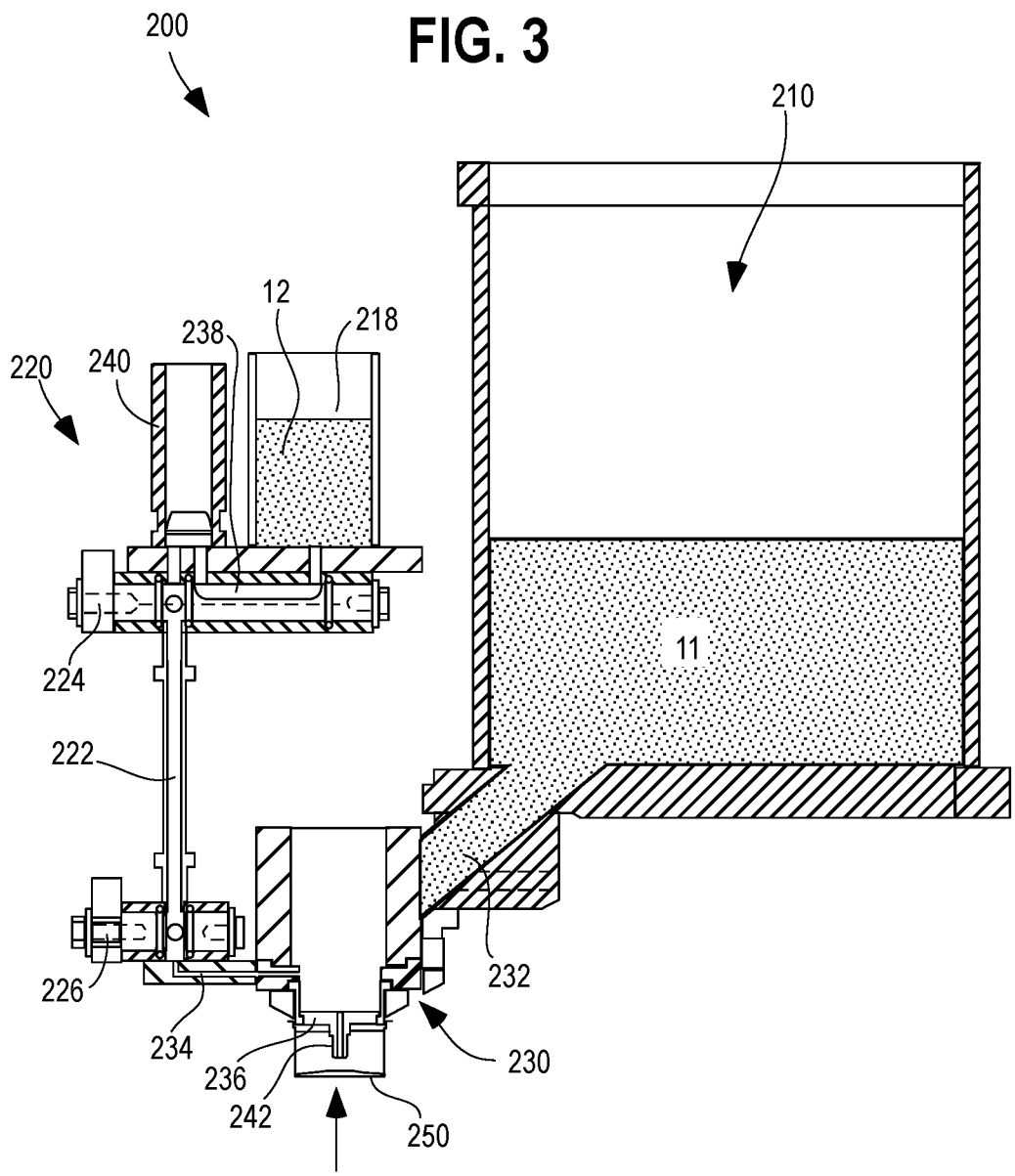
FIG. 3 is a schematic view of a filler device including a first embodiment of a second supply assembly including two rotary valves.
Figure 4A:
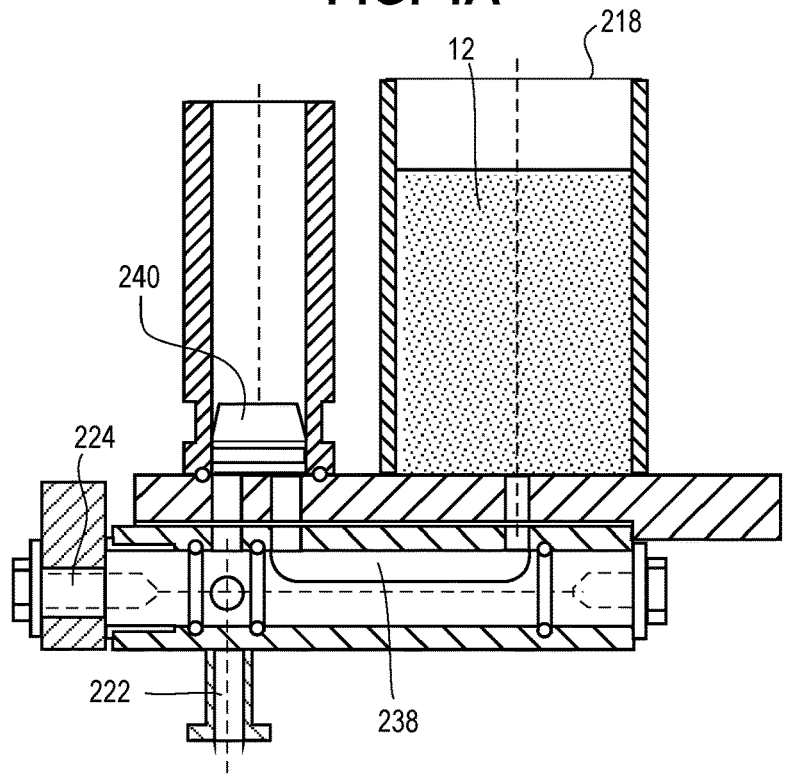
FIGS. 4A and 4B are schematic views of a first embodiment of the second supply assembly of FIG. 3.
Figure 4B:
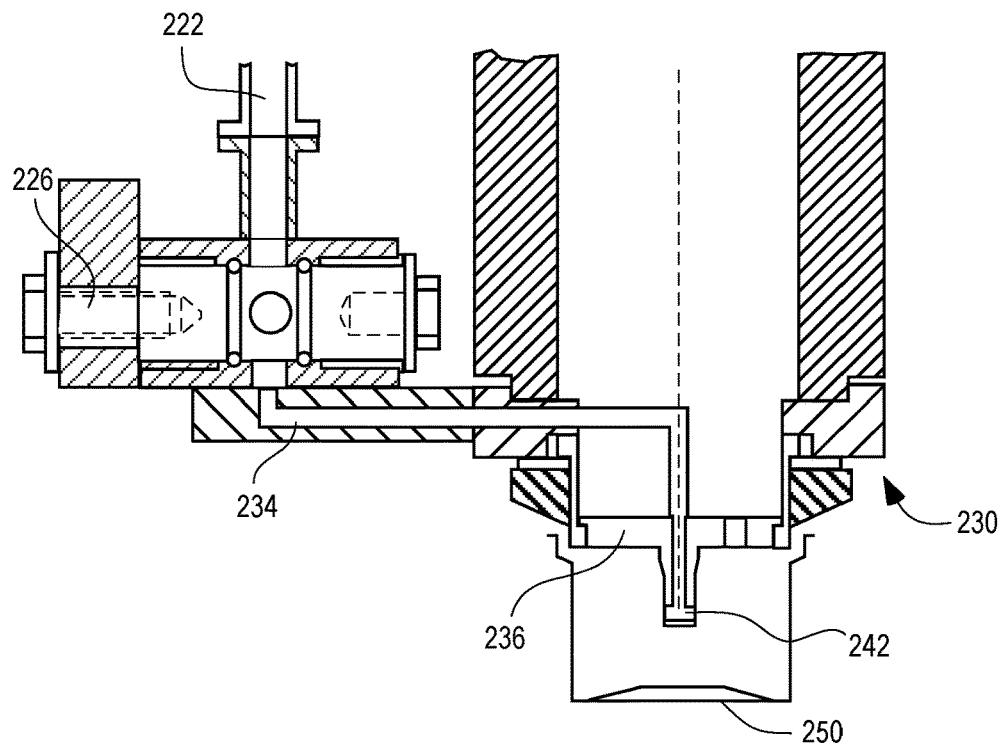

As used in this disclosure and the appended claims, the singular forms "a," "an," and "the" include plural referents unless the context clearly dictates otherwise. The words "comprise," "comprises," and "comprising" are to be interpreted inclusively rather than exclusively. Likewise, the terms "include," "including," and "or" should all be construed to be inclusive, unless such a construction is clearly prohibited from the context. However, the devices and methods disclosed herein may lack any element that is not specifically disclosed. Thus, a disclosure of an embodiment using the term "comprising" includes a disclosure of embodiments "consisting essentially of" and "consisting of" the components and steps identified.

The term "enclosed" means that the enclosed composition is completely or substantially enclosed in a food product. The enclosed composition is "substantially enclosed" if less than 20% of the enclosed composition is visible on the surface of the food product, preferably less than 10%, more preferably less than 5%, most preferably less than 1%.

The term "can" means a rigid retortable container, for example a metal container such as a metal or metal alloy cart a plastic container, a glass container, and combinations thereof. The term "canned" means that a food product is contained in a can.

The term "pet" means any animal which could benefit from or enjoy the food products provided by the present disclosure, The pet may be an avian, bovine, canine, equine, feline, hircine, lupine, murine, ovine, or porcine animal. The pet may be any suitable animal, and the present disclosure is not limited to a specific pet animal. The term "companion animal" means a dog or a cat. The term "pet food" means any composition intended to be consumed by a pet.

Ranges are used herein in shorthand to avoid listing every value within the range. Any appropriate value within the range may be selected as the upper value or lower value of the range. Moreover, the numerical ranges herein include all integers, whole or fractions, within the range.

All percentages expressed herein are by weight of the total weight of the food composition unless expressed otherwise. When reference is made to the pH, values correspond to pH measured at 25° C. with standard equipment. As used herein, "about" or "approximately" in reference to a number is understood to refer to numbers in a range of numerals, for example the range of −10% to +10%, preferably −5% to +5%, more preferably −1% to +1%, and even more preferably −0.1% to +0.1% of the referenced number.

FIGS. 1A and 1B generally show an embodiment of a food product 10 comprising a first composition 11, and the first composition 11 forms an outer matrix enclosing a second composition 12. These figures show the first composition 11 completely enclosing the second composition 12, but some embodiments of the food product 10 have the first composition 11 substantially enclosing the second composition 12.

The food product 10 may have a shape corresponding to the shape of the interior of the can in which the food product 10 is formed. For example, the food product 10 may be substantially cylindrical. However, the food product 10 is not limited to a specific shape and may have any shape.

In an embodiment, the second composition 12 is substantially centered in the food product 10 and has a spherical or ovoid shape. For example, the center of the second composition 12 is about the same as the center of the food product 10. Nevertheless, the food product 10 is not limited to the specific embodiment shown in FIGS. 1A and 1B.

The food product 10 may be a pet food, preferably for a companion animal. The food product 10 may be formed in a can as discussed in more detail later in this application. The first composition 11 and the second composition 12 may comprise any suitable amount of the food product 10. For example, the first composition 11 may comprise from about 25% to about 75% of the food product 10 while the second composition 12 may comprise the remaining 75% to 25% of the food product 10.

In an embodiment, the food product 10 may be one of the food products disclosed by U.S. patent application Ser. No. 13/896,470 to Watelain et al. filed on May 17, 2013 and published as U.S. Patent App. Publication No. 2013/0309372 on Nov. 21, 2013, herein incorporated by reference in its entirety. However, the food product 10 is not limited to the food products disclosed therein.

In an embodiment, the first composition 11 and the second composition 12 are not miscible or have low miscibility and thus form two different phases in the food product 10 that do not mix. This embodiment of the food product 10 comprises two separate phases, namely an outer phase corresponding to the first composition 11 and an inner phase corresponding to the second composition 12.

In an embodiment, the first composition 11 is an emulsion, for example a meat emulsion. The meat emulsion may comprise any suitable ingredients, for example fibrillar protein and polysaccharides. Suitable fibrillar proteins include myosin, actin, actomyosin, collagen, and mixtures thereof, such as protein from bovine, equine, ovine, avian, porcine, caprine, ovine, and piscine sources. Examples of suitable polysaccharides include starches, gums, or mixtures thereof.

In an embodiment, the second composition 12 is a dispersion, such as a colloid dispersion, for example a hydrocolloid dispersion. For example, the second composition 12 is a flowable sol, an emulsion, or a gel. As discussed in further detail below, the food product 10 may be retorted; depending on the formulation of the second composition 12, the second composition 12 may retain the original form in which it is injected into the first composition 11 or, alternatively, retorting may change the form of the second composition. For example, the second composition 12 may be injected into the first composition 11 as a flowable sol or an emulsion, and retorting of the food product 10 may change the form of the second composition 12 to a gel.

In one embodiment, the second composition 12 is a gravy comprising a thickener that is at least one of a starch or a gum, Examples of suitable gums are gellan gum, xanthan gum, locust bean gum, pectin, carrageenan (e.g., kappa, iota, and/or lambda), cellulose gum (e.g. carboxy methyl cellulose), gum arabic, konjac, guar gum, agar agar, cassia gum, alginate, and the like, and combinations thereof. Suitable starches include native starches, starch esters, starch ethers, and modified starches, such as starch modified with erythorbic acid, and combinations thereof. Starch sources may include wheat, barley, rice, tapioca, potato and corn, for example. The gravy may also comprise dextrose and/or glycine and may also include a colorant as desired. Ingredients that add flavor and/or aroma to the gravy may also be included as desired.

The first composition 11 and/or the second composition 12 may optionally include additional ingredients. For example, the first composition 11 and/or the second composition 12 may comprise visible pieces of real or simulated ingredients for aesthetic appeal or nutritional function. In some embodiments, at least one of the first composition 11 and the second composition 12 comprise solubilized or dispersed nutritional ingredients, flavor or aroma compounds, or encapsulated flavors or nutrients for release during retorting, in the mouth, or in the alimentary tract.

FIG. 2 shows an embodiment of a method 100 by which a canned food product may be made. The method 100 may comprise forming a first composition and a second composition, preferably separately from each other, in Step 102. In an embodiment, the first composition is an emulsion, for example, a meat emulsion. In an embodiment, the second composition is a dispersion, for example a gel, a flowable sol or an emulsion, in one embodiment, a gravy comprising a thickener that is at least one of a starch and a gum.

The method 100 may further comprise dispensing the first composition from a filler device into a can in Step 104. Then the can may begin descent away from the filler device in Step 106, preferably after the dispensing of the first composition into the can is completed.

Then a nozzle extending from the filler device may horizontally inject the second composition into the first composition in Step 108. In one embodiment, this horizontal injection comprises injection of the second composition in a direction that is, at least initially, substantially perpendicular relative to the pathway within the nozzle and/or the vertical axis of the can.

In one embodiment, the descent of the can away from the filler device may be briefly paused, and the nozzle may horizontally inject the second composition into the first composition during a time period consisting of this pause. This pause may be 1.5 seconds or less, for example, 0.25 to 1.5 seconds.

In Step 110, the descent of the can away from the filler device continues, and the nozzle is removed from the can. In an embodiment, the first composition encloses the second composition in this step. Optionally, the nozzle may be washed after removal from the can, for example by a water flush, in Step 112.

The method 100 may further include placing a lid on the can after the first and second compositions have been dispensed into the can, in Step 114; sealing the can, for example hermetically, in Step 116; and retorting the can, in Step 118. The can may be retorted at any suitable temperature for a suitable amount of time. For example, the can may be retorted a temperature from about 121° C. to about 128° C. for a time from 25 to 50 minutes. The filled can may optionally be inverted before retorting.

Then the can may be cooled by a device and/or allowed to equilibrate to room temperature in Step 120. For example, the can may be cooled to a temperature of 20° C. to 35° C. In an embodiment, the can is cooled to a temperature of 22° C. to 26° C. The resulting food product may comprise a firmly set first composition, such as a meat emulsion, forming an outer matrix enclosing the second composition, such as a gravy. For example, the resulting food product may be the food product 10 disclosed above.

FIGS. 3 and 6 show embodiments of a filler device 200 that may form the food product 10 comprising the first composition 11 enclosing the second composition 12. For example, the filler device 200 may be used in the method 100, such as Steps 104 and 106 of the method 100. However, the present disclosure is not limited to the embodiment of the filler device 200 disclosed herein and shown in the figures. In some embodiments, the food product 10 may be made by a different filler device, and the method 100 may be performed by a different filler device.

The filler device 200 may comprise a first supply assembly 210 that provides the first composition 11 and a second supply assembly 220, 320 provides the second composition 12. The filler device 200 may comprise a filling head 230. First and second embodiments of the second supply assembly 220, 320 are described below.

A first channel 232 may extend through the filling head 230 so that the filling head 230 may dispense the first composition 11 from the first supply assembly 210 into a can 300 that is positioned under the filling head 230. A second channel 234 may extend through the filling head 230 so that a nozzle 242 extending from the filling head 230 may dispense the second composition 12 from the second supply assembly 220 into the can 300. A port 236 may extend through the filling head 230 so that a vacuum may be formed in the can 300 which is used to draw the first composition into the can 300 from the first supply assembly 210. The first channel 232, the second channel 234, and the port 236 are not shown in all figures so that the other components are easily viewed, and the absence of one of these components from a figure does not imply that the component is no longer present in the filler device 200 at that stage.

A lifting plate 250 may position the can 300; for example, the can 300 may be placed on the lifting plate 250 so that movement of the lifting plate 250 moves the can 300 correspondingly. In an embodiment, the lifting plate 250 is configured to move the can 300 vertically toward and vertically away from the filling device 200. For example, the lifting plate 250 may be or may not be formed on a rotating cam. The lifting plate 250 may be one of a plurality of lifting plates, such as ninety lifting plates as a non-limiting example. The plurality of lifting plates may be rotated such that each lifting plate is aligned with the filler device 200 in turn.

A first embodiment of the second supply assembly 220 is shown in FIGS. 3, 4A, 4B, and 5A-5E. The second supply assembly 220 may be connected to the second channel 234 through a series of conduits in order to be injected into the can 300. To reach the second channel 234, the second composition 12 first travels from the second supply container 218 through a third channel 238 to a dosing piston 240. Operation of the dosing piston 240 directs the second composition 12 through a hose 222 to the second channel 234.

In the illustrated embodiment, the second supply assembly 220 includes first and second valves 224, 226. The first valve 224 is positioned between the dosing piston 240 and the hose 222. Operation of the first valve 224 determines whether the second composition 12 will be dispensed into the can 300. The second valve 226 is positioned between the hose 222 and the second channel 234. During the vacuum-filling of the can 300 with the first composition 11, closure of the second valve 226 of the second supply assembly 220 prevents the second composition 12 from being drawn into the can 300 and mixing with the first composition 11, which would cause the loaf product to have a poorly defined viscous filling. Each of the first valve 224 and/or the second valve 226 is a rotary valve driven by a mechanical cam. Enlarged views of the first valve 224 and the second valve 226 are provided in FIGS. 4A and 4B, respectively.

FIGS. 5A-5E illustrate the process of dispensing the second composition 12 from the second supply 220 during the operation of the filler device 200. In the beginning of the cycle shown in FIG. 5A, the first and second valves 224, 226 are closed. The suction of the piston 240 causes the second composition 12 to fill the third channel 238 leading to the dosing piston 240. The first and second valves 224, 226 remain closed and the dosing piston 240 remains empty while the can 300 is filled with the first composition 11.

Figure 5A:
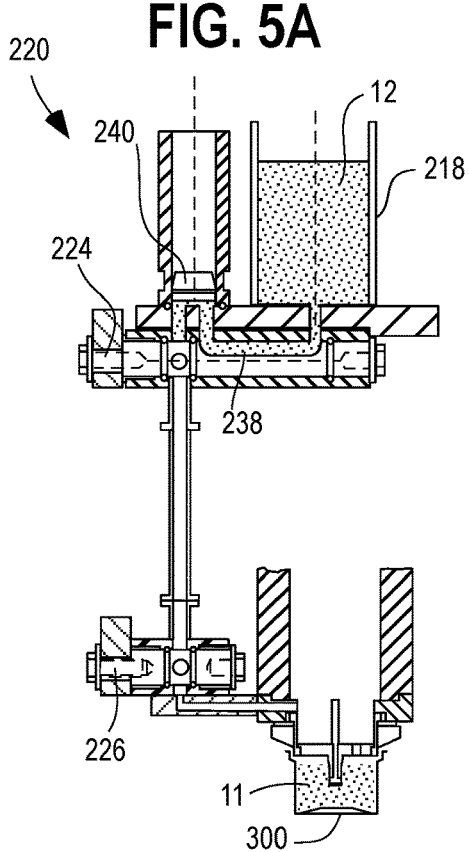
FIGS. 5A-5E are schematic views of the first embodiment of the second supply assembly of FIG. 3 and show operation thereof.
Figure 5B:
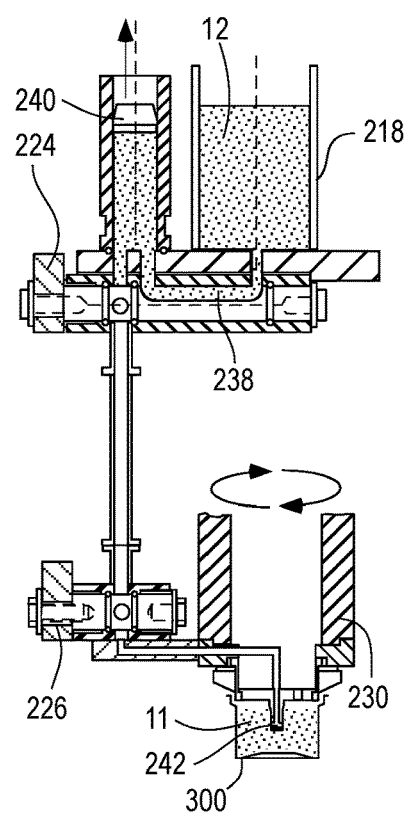

In the next stage of the cycle shown in FIG. 5B, the dosing piston 240 is operated to create a suction and fill the dosing piston 240 with a predetermined amount of the second composition 12 driven by the piston stroke. The first and second valves 224, 226 remain closed during this step. The filling head 230 is rotated to align the second channel 234 with the nozzle 242 to enable the second composition 12 to be injected into the first composition 11.

Figure 5C:
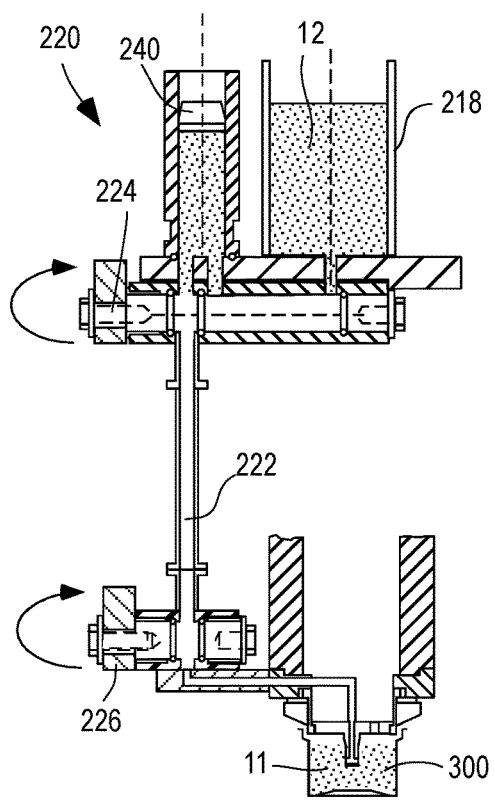

Once the dosing piston 240 is filled with the appropriate amount of the second composition 12, the next step is to open the first and second valves 224, 226 to allow the second composition 12 to be discharged from the dosing piston 240 into the hose 222. The first and second valves 224, 226 are opened as seen in FIG. 5C.

Figure 5D:
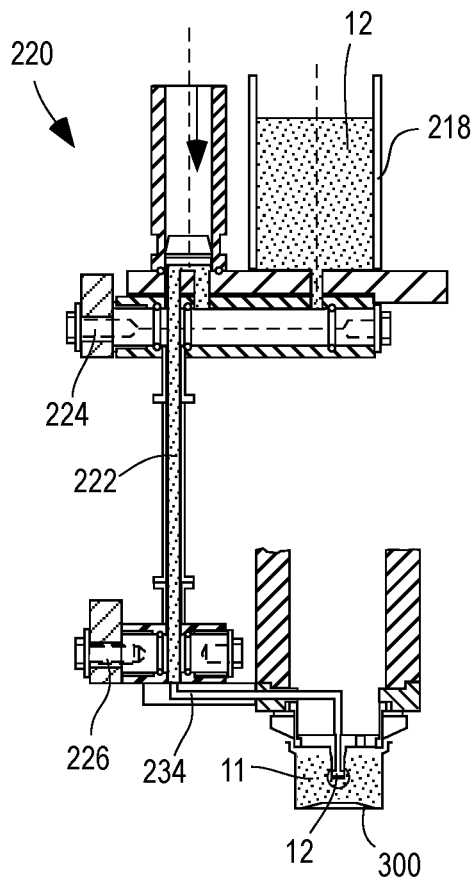
Figure 5E:
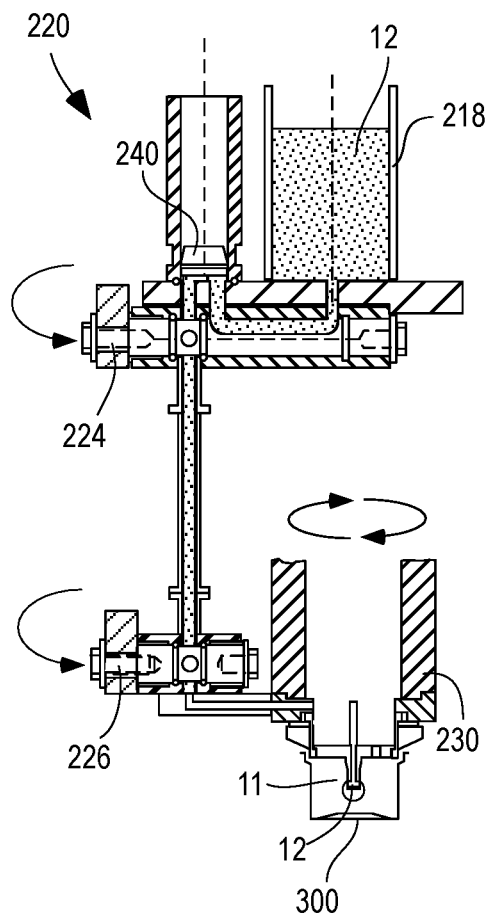

Referring to FIG. 5D, the dosing piston 240 is then operated to discharge the second composition 12 from the piston 240 through the hose 222 and second channel 234 into the first composition 11 within the can 300. Once the injection is complete, the valves 224, 226 are closed, as seen in FIG. 5E. The filling head 230 is rotated to move the second conduit 234 out of alignment with the nozzle 242.

A second embodiment of the second supply assembly 320 is shown in FIGS. 6, 7A-7C, and 8A-8E. The second supply container 318 may be connected to the second channel 334 through a series of conduits in order to be injected into the can 300, similar to the first embodiment described above. To reach the second channel 334, the second composition 12 first travels from the second supply 320 through a third channel 338 to a dosing piston 340. Operation of the dosing piston 340 directs the second composition 12 through a hose 322 to the second channel 334.

In the illustrated embodiment, a first valve 324 is positioned between the dosing piston 340 and the hose 322. The first valve 324 is a rotary valve driven by a mechanical cam. Operation of the first valve 324 determines whether the second composition 12 will be dispensed into the can 300, similar to the first valve 224 of the first embodiment of the second supply assembly 220. An enlarged view of the first valve 324 is provided in FIG. 7A.

Figure 7A:
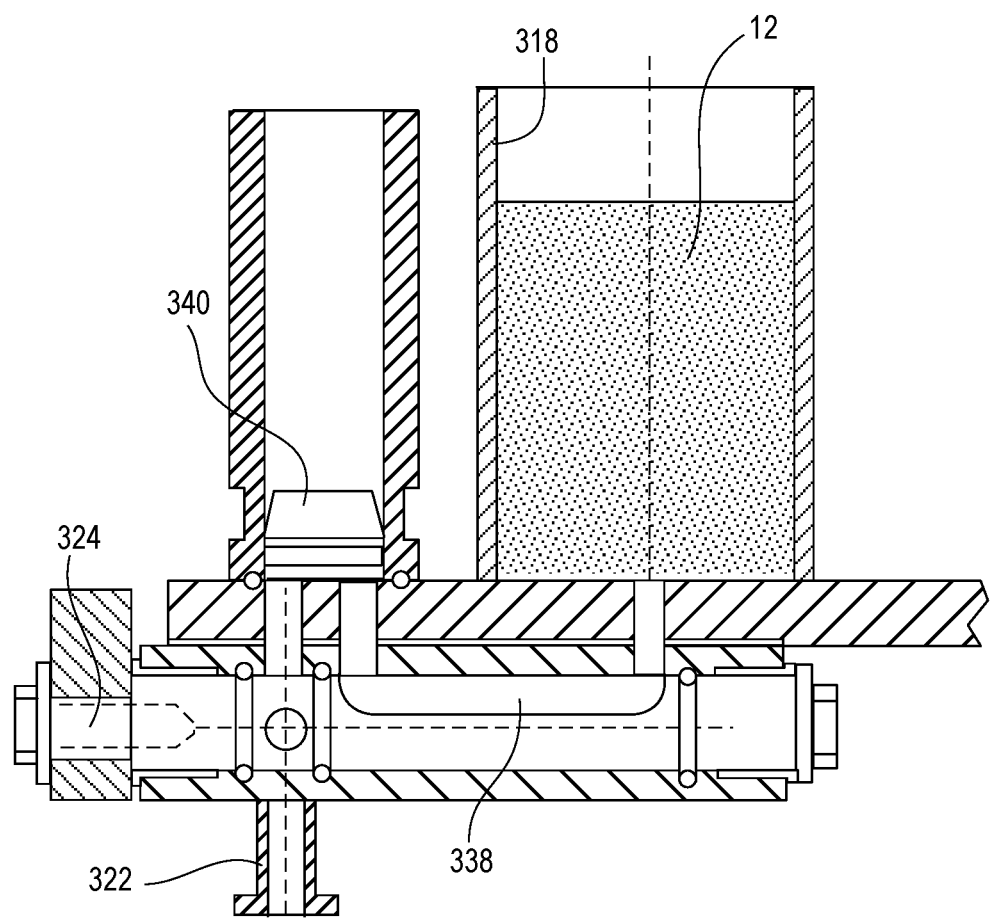
FIGS. 7A-7C are schematic views of a second embodiment of the second supply assembly of FIG. 6.
Figure 7B:
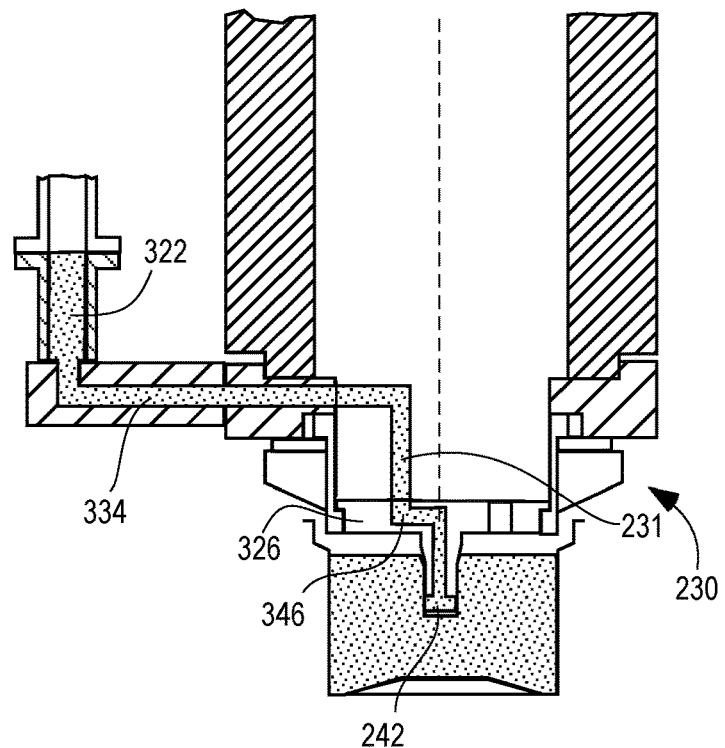
Figure 7C:
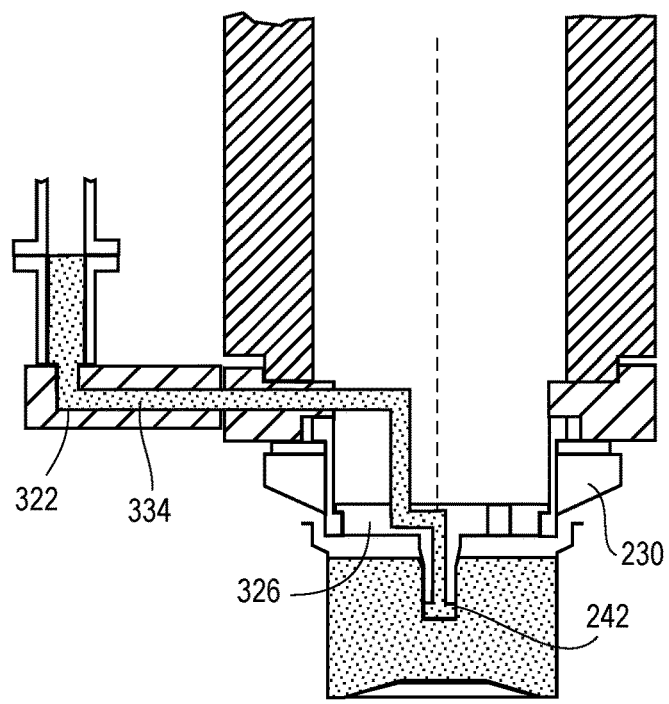
Figure 8A:
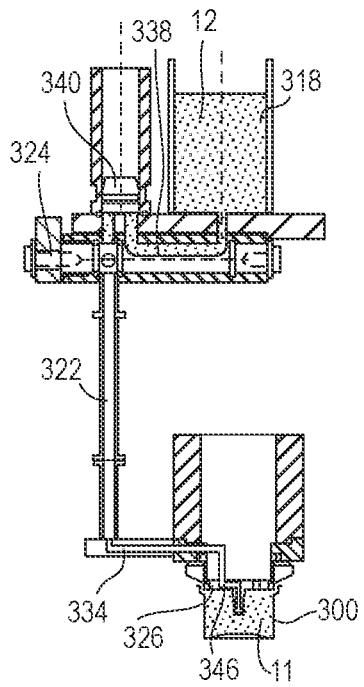
FIGS. 8A-8E are schematic views of the second embodiment of the second supply assembly of FIG. 6 and show operation thereof.
Figure 8B:
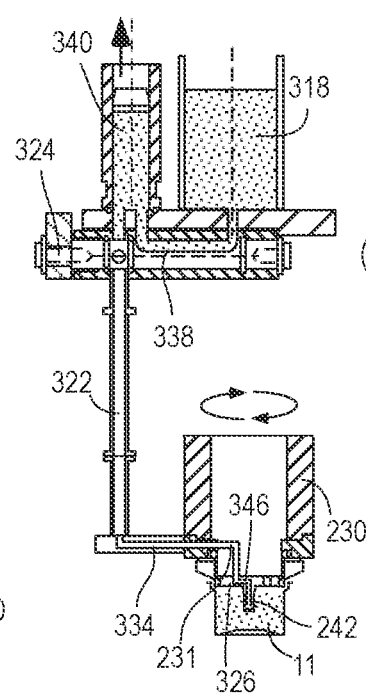

The second supply assembly 310 also includes a fixed plate 326 underneath the filling head 230 containing a plate channel 346 that connects the second channel 334 and a filling head channel 231 with the nozzle 242 when in an open position, thereby allowing the second composition 12 to flow through the second channel 334 and nozzle 242 into the can 300. The rotating filling head 230, along with the internal filling head channel 231, rotates in such a way that the second channel 334 is not in fluid connection with the plate channel 346 and nozzle 242, thus preventing the second composition 12 from reaching the nozzle 242. During the vacuum-filling of the can 300 with the first composition 11, positioning the filling head 230 in the closed position, i.e., such that the filling head channel 231 is out of alignment with the second channel 334 and nozzle 242 as shown in FIG. 8A, prevents the second composition 12 from being drawn into the can 300 and mixing with the first composition 11, similar to the operation of the second valve 226 of the first embodiment of the second supply assembly 220. FIG. 8B illustrates the filling head 230 in an open position such that the filling head channel 231 is aligned and in fluid connection with the second channel 334 and nozzle 242. FIGS. 7A-7C provide enlarged views of the first valve 324 and the plate 326.

FIGS. 8A-8E illustrate the process of dispensing the second composition 12 from the second supply assembly 320 during the operation of the filler device 200. In the beginning of the cycle shown in FIG. 8A, the first valve 324 is closed. The suction of the piston 340 causes the second composition 12 to accumulate in the third channel 338 leading to the dosing piston 340. The first valve 324 remains closed and the plate 326 remains in a closed position by means of the rotating filling head 230 while the can 300 is filled with the first composition 11.

Figure 8C:
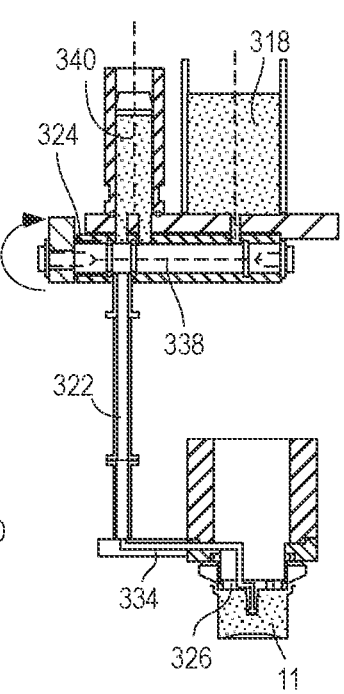

In the next stage of the cycle shown in FIG. 8B, the dosing piston 340 is operated to prepare for filling the can 300 with a predetermined amount of the second composition 12. The first valve 324 remains closed while the filling head 230 is rotated to align the second channel 334 with the plate channel 346 of the plate 326 to enable the second composition 12 to be injected into the first composition 11. After the dosing piston 340 is filled with the appropriate amount of the second composition 12, the next step is to open the first valve 324 to allow the second composition 12 to be discharged from the dosing piston 340 into the hose 322. The first valve 324 is opened as seen in FIG. 8C. The plate 326 is aligned with the second channel 334 and the filling head channel 231 at this point.

Figure 8D:
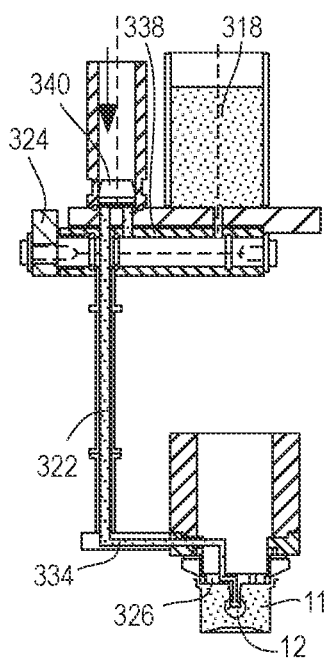
Figure 8E:
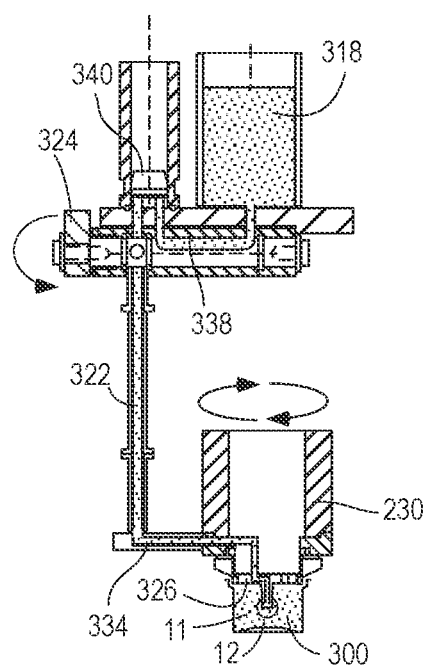

Referring to FIG. 8D, the dosing piston 340 is then operated to discharge the second composition 12 from the piston 340 through the hose 322 and second channel 334 into the first composition 11 within the can 300. Once the injection is complete, the first valve 324 is closed and the filling head 230 is rotated so that the second channel 334 and the filling head channel 231 are no longer aligned, thus closing the fluid connection with the plate channel 346, as seen in FIG. 8E.

Figure 9:
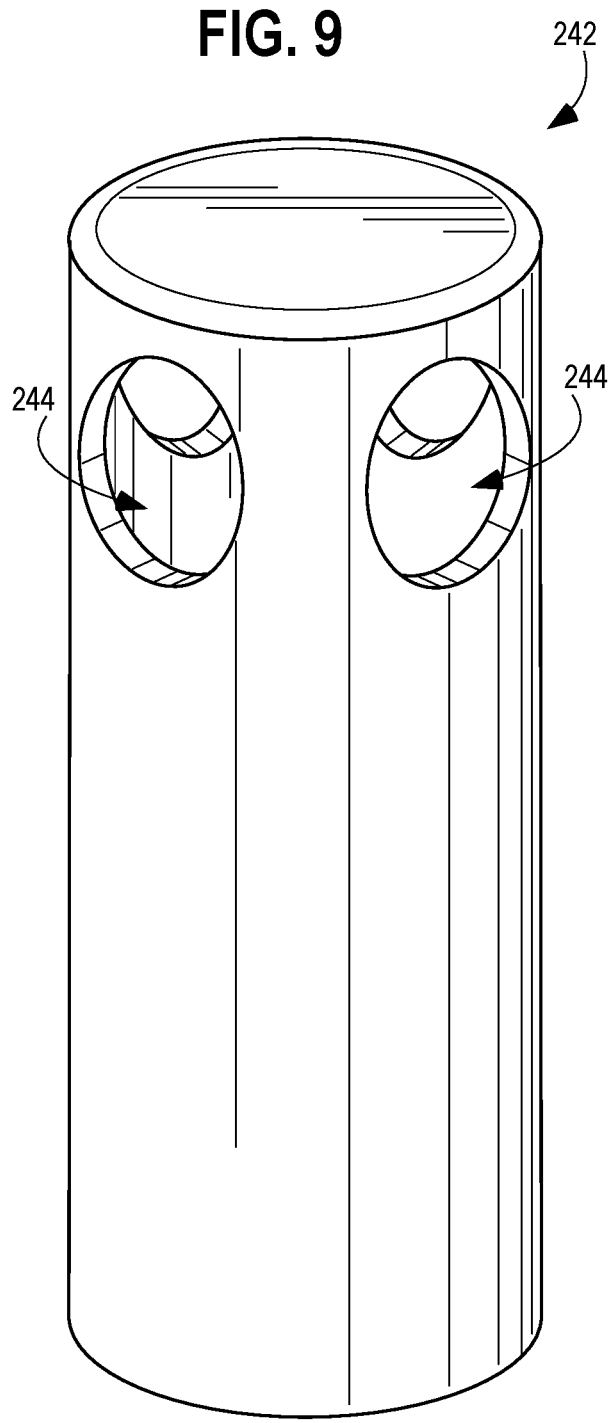
FIG. 9 shows a perspective view of an embodiment of a nozzle provided by the present disclosure.

In some embodiments, the nozzle 242 may comprise horizontally-facing apertures 244 that may be positioned in lateral surfaces of the nozzle 242 as shown in FIG. 9. The horizontally-facing apertures 244 may be at the same height on the nozzle 242 and may be evenly spaced from each other on the nozzle 242. For example, the nozzle 242 may comprise four of the horizontally-facing apertures 244, spaced ninety degrees apart in the nozzle 242. In an embodiment, the horizontally-facing apertures 244 are positioned at the approximate center of the first composition 11, both horizontally and vertically, during injection of the second composition 12. The horizontally-facing apertures 244 may be any suitable diameter, for example a diameter of about 5 mm.

Figure 10A:
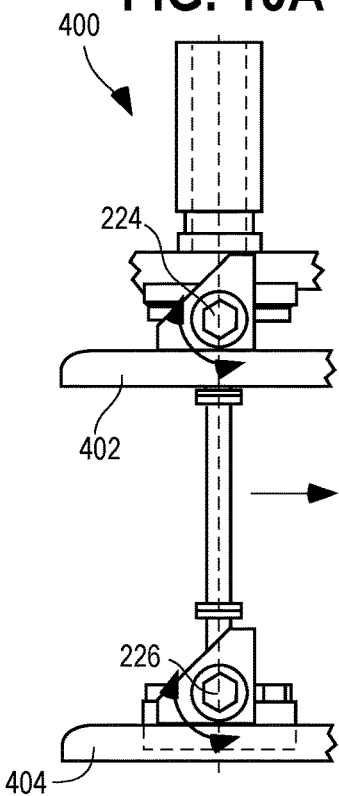
FIGS. 10A and 10B are schematic views of a first embodiment of a mechanical cam assembly of the second supply assembly of FIGS. 5A-5E.
Figure 10B:
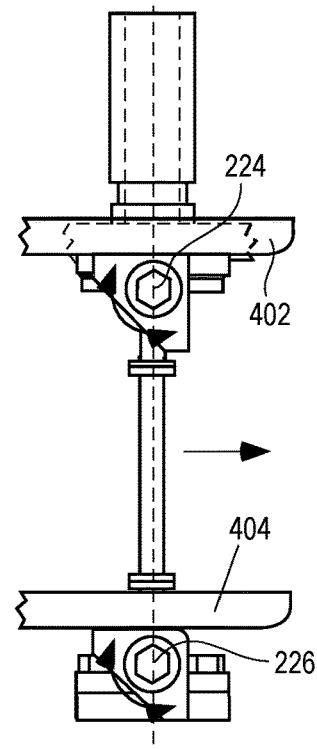

FIGS. 10A-11B illustrate exemplary embodiments of first and second assemblies 400, 420 driving the first and second valves 224, 226 of the second supply assembly 220. In FIGS. 10A and 10B, the first mechanical assembly 400 includes a first mechanical cam 402 that drives the first valve 224 and a second mechanical cam 404 that drives the second valve 226. Cams 402 and 404 move between the closed and open positions as shown in FIGS. 10A and 10B, respectively.

Figure 11A:
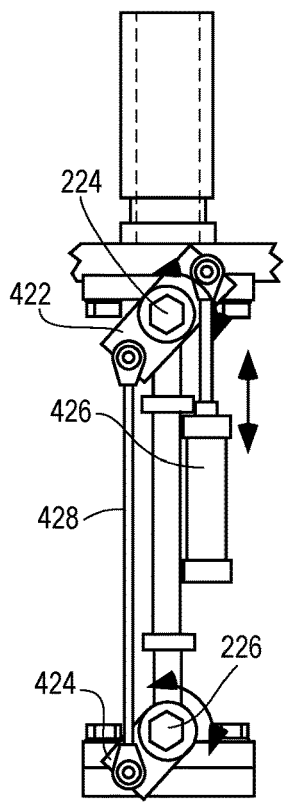
FIGS. 11A and 11B are schematic views of a second embodiment of a mechanical cam assembly of the second supply assembly of FIGS. 5A-5E.
Figure 11B:
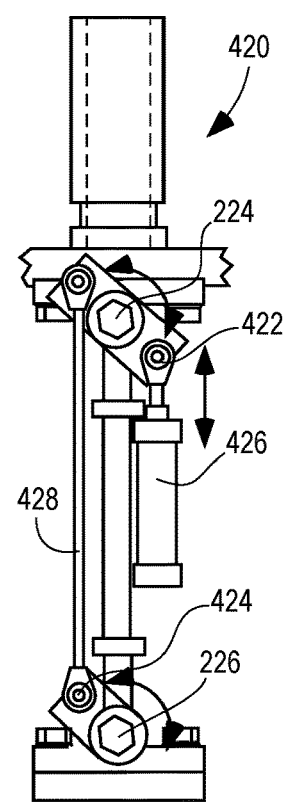

FIGS. 11A and 11B illustrate the second mechanical assembly 420 driving the first valve 224 and the second valve 226 of the second supply assembly 220. In FIGS. 11A and 11B, the mechanical assembly 420 includes first and second mounting levers 422, 424 onto which the first and second valves 224, 226, respectively, are secured and which are connected by a rod 428. A pneumatic piston 426 is connected to a proximal end of the first lever surface 422, and the rod 428 extends between distal ends of the first and second mounting lever 422, 424. Pressure applied through the pneumatic piston 426 causes the first and second mounting lever 422, 424 to rotate simultaneously, as shown in FIGS. 11A and 11B.

In both embodiments 400, 420, a pneumatic piston may be used to drive rotation of the valves. The compressed air may be supplied to the pneumatic piston through a pneumatic distributor. In some embodiments, the pneumatic distributor may be mechanically driven or remotely via wireless communications from a control mechanism of the filler device 200 described in greater detail below.

In an embodiment, the filler device 200 is connected to a control mechanism, for example a computer or another device comprising a processor. The filler device 200 may also include and/or be connected to a mechanical cam system. The control mechanism and/or mechanical cam system may control the progression of the first and second supply assemblies 210, 220, 320 of the filler device 200 through the stages shown in FIGS. 5A-5E and/or 8A-8E. For example, the control mechanism and/or mechanical cam system may control and coordinate operation of the valves 224, 226, 324 and/or plate 326, the dosing piston 240, 340. In an embodiment, the control mechanism and/or mechanical cam system controls the relative timing of these components of the filler device 200; for example, the control mechanism may synchronize the first and second valves 224, 226 so that the valves are opened and/or closed at the same time.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for making a canned food product in a can, the canned food product comprising a first composition and a second composition, the apparatus comprising:
   a filling head including a first channel and a second channel configured for respectively directing the first composition and the second composition into the can, wherein the filling head further includes a nozzle;
   a first supply assembly including a first supply container containing the first composition, wherein the first supply container is connected to the first channel; and
   a second supply assembly including:
      a second supply container containing the second composition;
      a dosing piston connected to the second supply container through a third channel;
      a hose connecting the dosing piston to the second channel;
      a first rotary valve positioned between the dosing piston and the hose; and
      a second rotary valve on the second channel, the first rotary valve and the second rotary valve are mechanically-operated by a cam device;
   wherein the nozzle is configured to dispense the second composition through the nozzle into the first composition.

2. The apparatus of claim 1, wherein the second rotary valve is positioned between the hose and the second channel.

3. The apparatus of claim 1, wherein the second rotary valve is positioned within the filling head.

4. The apparatus of claim 3, wherein the second rotary valve includes a valve channel that connects the second channel with the nozzle.

5. The apparatus of claim 1, wherein the dosing piston is configured to withdraw a predetermined amount of the second composition from the second supply container.

6. The apparatus of claim 5, wherein the first rotary valve moves between an open position and a closed position, and wherein the dosing piston is configured to withdraw the predetermined amount of the second composition from the second supply container while the first rotary valve is in the closed position.

7. The apparatus of claim 6, wherein the dosing piston is configured to discharge the predetermined amount of the second composition through the hose while the first rotary valve is in the open position.

8. The apparatus of claim 1, wherein the second rotary valve moves between an open position and a closed position, and wherein the filling head is configured to fill the can with the first composition while the second rotary valve is in the closed position.

9. A method for making a canned food product in a can, the food product comprising a first composition and a second composition, the method comprising:
   providing a filling head including a first channel and a second channel configured for respectively directing the first composition and the second composition into the can;
   providing a first supply assembly including a first supply container containing the first composition, wherein the first supply container is connected to the first channel; and
   providing a second supply assembly including:
      a second supply container containing the second composition;
      a dosing piston connected to the second supply container through a third channel;
      a hose connecting the dosing piston to the second channel;
      a first rotary valve positioned between the dosing piston and the hose; and
      a second rotary valve on the second channel;
   closing the first and second rotary valves;
   positioning the can on the filling head;
   dispensing the first composition from the first supply container through a filling head into the can;
   withdrawing a predetermined amount of the second composition from the second supply container into the dosing piston;
   opening the first and second rotary valves by operating the first and second rotary valves using a mechanically-driven cam device; and
   dispensing the second composition from the dosing piston into the first composition within the can such that the first composition encloses the second composition.

10. The method of claim 9, further comprising:
    closing the first and second rotary valves after the dispensing of the second composition from the dosing piston; and
    removing the can from the filling head.

11. The method of claim 9, wherein, during the withdrawing of the predetermined amount of the second composition into the dosing piston, the first rotary valve is closed.

12. The method of claim 9, wherein the dispensing of the first composition from the first supply container through a filling head into the can comprises filling the can with the first composition under a vacuum.

13. The method of claim 12, wherein, during the filling of the can, the second rotary valve is closed.

14. The method of claim 9, wherein the first composition is a meat emulsion.

15. The method of claim 9, wherein the second composition is a gravy.

16. The method of claim 9, further comprising retorting the can in which the first composition encloses the second composition.

17. A method for making a canned food product in a can, the food product comprising a first composition and a second composition, the method comprising:
providing a second supply assembly including:
a second supply container containing the second composition;
a dosing piston connected to the second supply container through a first channel;
a hose connecting the dosing piston to a second channel;
a first rotary valve positioned between the dosing piston and the hose; and
a second rotary valve on the second channel;
closing the first and second rotary valves;
dispensing the first composition from a first supply container through a filling head into the can;
withdrawing a predetermined amount of the second composition from the second supply container into the dosing piston;
opening the first and second rotary valves by operating the first and second rotary valves using a mechanically-driven cam device; and
dispensing the second composition from the dosing piston into the first composition within the can such that the first composition encloses the second composition.

18. An apparatus for making a canned food product in a can, the canned food product comprising a first composition and a second composition, the apparatus comprising:
a filling head including a first channel and a second channel configured for respectively directing the first composition and the second composition into the can, wherein the filling head further includes a nozzle;
a first supply assembly including a first supply container containing the first composition, wherein the first supply container is connected to the first channel; and
a second supply assembly including: a second supply container containing the second composition;
a dosing piston connected to the second supply container through a third channel;
a hose connecting the dosing piston to the second channel; and
a rotary valve positioned between the dosing piston and the hose, the rotary valve is mechanically-operated by a cam device;
wherein the nozzle is configured to dispense the second composition through the nozzle into the first composition.

19. A method for making a canned food product in a can, the food product comprising a first composition and a second composition, the method comprising:
providing a filling head including a first channel and a second channel configured for respectively directing the first composition and the second composition into the can;
providing a first supply assembly including a first supply container containing the first composition, wherein the first supply container is connected to the first channel; and
providing a second supply assembly including:
a second supply container containing the second composition;
a dosing piston connected to the second supply container through a third channel;
a hose connecting the dosing piston to the second channel;
a rotary valve positioned between the dosing piston and the hose;
closing the rotary valve;
positioning the can on the filling head;
dispensing the first composition from the first supply container through a filling head into the can;
withdrawing a predetermined amount of the second composition from the second supply container into the dosing piston;
opening the rotary valve by operating the rotary valve using a mechanically-driven cam device; and
dispensing the second composition from the dosing piston into the first composition within the can such that the first composition encloses the second composition.

20. The method of claim 19, wherein the cam device comprises a first mechanical cam that drives the first rotary valve, and the cam device further comprises a second mechanical cam that drives the second rotary valve.

21. The method of claim 19, wherein the cam device is part of a mechanical cam system that controls operation of the first rotary valve, the second rotary valve, and the dosing piston.

22. The method of claim 21, wherein the mechanical cam system synchronizes operation of the first rotary valve and the second rotary valve.

\* \* \* \* \*